United States Patent
Guo et al.

(10) Patent No.: US 12,194,495 B2
(45) Date of Patent: Jan. 14, 2025

(54) ULTRASONIC SENSOR, DRIVING METHOD THEREOF AND MANUFACTURING METHOD THEREOF

(71) Applicant: BOE TECHNOLOGY GROUP CO., LTD., Beijing (CN)

(72) Inventors: Yuzhen Guo, Beijing (CN); Yingming Liu, Beijing (CN); Haisheng Wang, Beijing (CN); Xiufeng Li, Beijing (CN); Lijun Zhao, Beijing (CN); Peixiao Li, Beijing (CN); Yaqian Ji, Beijing (CN); Chenyang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 921 days.

(21) Appl. No.: 17/184,709

(22) Filed: Feb. 25, 2021

(65) Prior Publication Data

US 2021/0260620 A1 Aug. 26, 2021

(30) Foreign Application Priority Data

Feb. 26, 2020 (CN) .......................... 202010119917.9

(51) Int. Cl.
*B06B 1/02* (2006.01)
*B06B 1/06* (2006.01)
*G01D 5/48* (2006.01)

(52) U.S. Cl.
CPC .......... *B06B 1/0223* (2013.01); *B06B 1/0215* (2013.01); *B06B 1/0692* (2013.01); *G01D 5/48* (2013.01)

(58) Field of Classification Search
CPC ... B06B 1/0223; B06B 1/0692; B06B 1/0215; G01D 5/48
See application file for complete search history.

(56) References Cited

U.S. PATENT DOCUMENTS

2006/0184033 A1 8/2006 Cerofolini
2015/0189136 A1* 7/2015 Chung ................. G06F 3/0443
348/77

(Continued)

FOREIGN PATENT DOCUMENTS

CN 102289972 A 11/2011
CN 102830169 A 12/2012

(Continued)

OTHER PUBLICATIONS

China Patent Office, First Office Action dated Jun. 3, 2021, for corresponding Chinese application 202010119917.9.

(Continued)

*Primary Examiner* — J. San Martin
(74) *Attorney, Agent, or Firm* — HOUTTEMAN LAW LLC

(57) ABSTRACT

The present disclosure provides an ultrasonic sensor, a method for driving the same, and a method for manufacturing the same. The ultrasonic sensor includes a back plate, a sounding structure on the back plate and a backing layer on a side of the sounding structure distal to the back plate; the sounding structure includes a plurality of emitting electrodes, an opposite electrode, a piezoelectric layer and a plurality of signal leads, and the plurality of emitting electrodes and the opposite electrode are respectively arranged on two sides of the piezoelectric layer; and the plurality of emitting electrodes are arranged in an array, and each of the emitting electrodes is individually coupled to one of the signal leads. The ultrasonic sensor may achieve an independent control for each patterned electrode such that the ultrasonic sensor may be used as a point sound source.

20 Claims, 8 Drawing Sheets

(56) References Cited

U.S. PATENT DOCUMENTS

| | | |
|---|---|---|
| 2017/0110504 A1 | 4/2017 | Panchawagh et al. |
| 2018/0068153 A1 | 3/2018 | Bai |
| 2018/0068154 A1 | 3/2018 | Sun et al. |
| 2018/0177490 A1 | 6/2018 | Shiraishi |
| 2020/0020732 A1 | 1/2020 | Bu et al. |
| 2021/0303814 A1* | 9/2021 | Liu .................... G06V 40/1347 |

FOREIGN PATENT DOCUMENTS

| | | |
|---|---|---|
| CN | 105426024 A | 3/2016 |
| CN | 106384088 A | 2/2017 |
| CN | 107066096 A | 8/2017 |
| CN | 107229284 A | 10/2017 |
| CN | 108073852 A | 5/2018 |
| CN | 109492483 A | 3/2019 |
| CN | 110265544 A | 9/2019 |
| CN | 110287871 A | 9/2019 |
| EP | 2578324 A | 4/2013 |
| JP | S60242365 A | 12/1985 |
| JP | 2005277864 A | 10/2005 |
| JP | 2011137768 A | 7/2011 |
| JP | 5923205 B | 5/2016 |

OTHER PUBLICATIONS

Jing, et al. "Development and Application of Ultrasonic Phased Array Testing Technology" Journal of Elecronic Measurement and Instrumentation, vol. 28, No. 9, dated Sep. 30, 2014.

China Patent Office, Second Office Action dated Jan. 30, 2022, for corresponding Chinese application 202010119917.9.

Wei, et al., "Analysis of Influence of Linear Array Phased Transducer Array Parameters on Focusing Performance", Apr. 15, 2018, Technical Acoustics, vol. 37, No. 2.

Hao-Li Liu, et al., "Design and Implementation of a Transmit Ultrasound Phased Array for Brain Applications", Oct. 31, 2018, IEEE Transactions on Ultrasonics, Ferroelectrics, and Frequency Control, vol. 65, No. 10.

Li, et al., "Structure and Characteristics of Ultrasonic Array Probes", Dec. 25, 2005, NDT, vol. 29 No. 6.

* cited by examiner

ULTRASONIC SENSOR, DRIVING METHOD THEREOF AND MANUFACTURING METHOD THEREOF

CROSS REFERENCE TO RELATED APPLICATIONS

The present disclosure claims priority to the Chinese patent application No. 202010119917.9 filed on Feb. 26, 2020, the content of which is incorporated herein by reference in its entirety.

TECHNICAL FIELD

The present disclosure belongs to the technical field of a sound source, and particularly relates to an ultrasonic sensor, a driving method thereof and a manufacturing method thereof.

BACKGROUND

An ultrasonic sensor is a sensor that converts an ultrasonic signal into another energy signal (typically an electrical signal) or converts another energy signal (typically an electrical signal) into an ultrasonic signal.

SUMMARY

The present disclosure provides an ultrasonic sensor, a method for driving the same, and a method for manufacturing the same.

The ultrasonic sensor includes a back plate, a sounding structure on the back plate, and a backing layer on a side of the sounding structure distal to the back plate; wherein the sounding structure includes a plurality of emitting electrodes, an opposite electrode, a piezoelectric layer and a plurality of signal leads, and the plurality of emitting electrodes and the opposite electrode are respectively on two sides of the piezoelectric layer; and the plurality of emitting electrodes are in an array, and each emitting electrode of the plurality of emitting electrodes is individually coupled to one signal lead of the plurality of signal leads.

In an embodiment, the opposite electrode includes a plurality of receiving electrodes in an array and a plurality of receiving detection circuits electrically coupled to the plurality of receiving electrodes, and the plurality of receiving electrodes are on a side of the piezoelectric layer proximal to the back plate, and the receiving detection circuits are on a side of the sounding structure proximal to the back plate.

In an embodiment, an orthographic projection of each of the plurality of emitting electrodes on the back plate overlaps with an orthographic projection of n*n receiving electrodes of the plurality of receiving electrodes on the back plate; where n is any one of 1 to 9.

In an embodiment, each of the plurality of emitting electrodes is square or circular in shape.

In an embodiment, each receiving detection circuit includes a diode and a transistor for each receiving electrode, the transistor includes an active layer, a gate, a first electrode and a second electrode, the diode includes a P-type region and an N-type region, and a third electrode and a fourth electrode electrically coupled to the P-type region and the N-type region, respectively, the first electrode and the second electrode of the transistor and the third electrode and the fourth electrode of the diode are made of a same material and are in a same layer, and a first insulating layer is between the first electrode and the second electrode of the transistor and the third electrode and the fourth electrode of the diode and the sounding structure; the plurality of emitting electrodes are on a side of the piezoelectric layer distal to the back plate, the plurality of receiving electrodes are on a side of the piezoelectric layer proximal to the back plate, and a second insulating layer is between the plurality of receiving electrodes and the piezoelectric layer; and the first electrode of the transistor and the third electrode of the diode are coupled to the receiving electrode through a via hole in the first insulating layer.

In an embodiment, the plurality of signal leads and the plurality of emitting electrodes are in a same layer; and a third insulating layer is between the plurality of emitting electrodes and the backing layer.

In an embodiment, the plurality of signal leads are on a side of the plurality of emitting electrodes distal to the piezoelectric layer, and a fourth insulating layer is between the plurality of emitting electrodes and the plurality of signal leads; the plurality of signal leads are coupled to the plurality of emitting electrodes through a plurality of via holes in the fourth insulating layer, respectively; and a fifth insulating layer is between the plurality of signal leads and the backing layer.

In an embodiment, the plurality of signal leads and the first electrode of the transistor are made of a same material and are in a same layer, and the plurality of signal leads are coupled to the plurality of emitting electrodes through a plurality of via holes in the first insulating layer, the second insulating layer, and the piezoelectric layer, respectively; and a third insulating layer is between the plurality of emitting electrodes and the backing layer.

In an embodiment, the backing layer and the opposite electrode are a unitary structure.

In an embodiment, a material of the backing layer and the opposite electrode includes silver.

In an embodiment, the ultrasonic sensor further includes a plurality of receiving electrodes in an array on a side of the piezoelectric layer proximal to the back plate, and a plurality of receiving detection circuits electrically coupled to the plurality of receiving electrodes, wherein, each receiving detection circuit includes a diode and a transistor for each receiving electrode, the transistor includes an active layer, a first electrode and a second electrode, the diode includes a third electrode and a fourth electrode, the first electrode and the second electrode of the transistor and the third electrode and the fourth electrode of the diode are made of a same material and are in a same layer, and a first insulating layer is between the first electrode and the second electrode of the transistor and the third electrode and the fourth electrode of the diode and the sounding structure; and the plurality of emitting electrodes are on a side of the plurality of receiving electrodes proximal to the back plate, a second insulating layer is between the plurality of receiving electrodes and the piezoelectric layer, and a sixth insulating layer is between the plurality of emitting electrodes and the plurality of receiving electrodes.

In an embodiment, the plurality of signal leads and the plurality of emitting electrodes are in a same layer; and each emitting electrode of the plurality of emitting electrodes has hollowed-out regions, the hollowed-out regions are filled with a material of the sixth insulating layer, and the first electrode of the transistor and the third electrode of the diode are coupled to the receiving electrode through via holes in the first insulating layer and in the material of the sixth insulating layer in the hollowed-out regions.

In an embodiment, the plurality of signal leads and the first electrode of the transistor are made of a same material and are in a same layer; the plurality of signal leads are coupled to the plurality of emitting electrodes through a plurality of via holes in the first insulating layer, respectively; each emitting electrode of the plurality of emitting electrodes has hollowed-out regions, the hollowed-out regions are filled with a material of the sixth insulating layer, and the first electrode of the transistor and the third electrode of the diode are coupled to the receiving electrode through via holes in the first insulating layer and in the material of the sixth insulating layer in the hollowed-out regions.

In an embodiment, a material of the plurality of emitting electrodes and a material of the plurality of signal leads include a metallic conductive material, and a material of the backing layer includes silver.

The present disclosure also provides a method for driving the above ultrasonic sensor, including steps of: applying a ground voltage signal to the opposite electrode; and applying a plurality of driving voltage signals to the plurality of emitting electrodes, respectively, such that the plurality of driving voltage signals applied to the plurality of emitting electrodes have different phases.

In an embodiment, the step of applying a plurality of driving voltage signals to the plurality of emitting electrodes respectively includes simultaneously applying a plurality of driving voltage signals with different phases to the plurality of emitting electrodes.

In an embodiment, the step of applying a plurality of driving voltage signals to the plurality of emitting electrodes respectively includes applying a same driving voltage signal to the plurality of emitting electrodes at different times.

The present disclosure also provides a method for manufacturing an ultrasonic sensor, including steps of sequentially forming a sounding structure on a back plate and forming a backing layer, wherein the step of forming the sounding structure includes forming a plurality of emitting electrodes, forming an opposite electrode, forming a piezoelectric layer and forming a plurality of signal leads, and the plurality of emitting electrodes and the opposite electrode are respectively arranged on two sides of the piezoelectric layer; and wherein the steps of forming a plurality of emitting electrodes and forming a plurality of signal leads include forming a pattern of the plurality of emitting electrodes arranged in an array and the plurality of signal leads, such that each of the plurality of emitting electrodes is individually coupled to one of the plurality of signal leads.

In an embodiment, the opposite electrode includes a plurality of receiving electrodes on a side of the piezoelectric layer proximal to the back plate, and the steps of forming a plurality of emitting electrodes and forming a plurality of signal leads include simultaneously forming the pattern of the plurality of emitting electrodes and the plurality of signal leads on a side of the piezoelectric layer distal to the back plate by a single patterning process.

In an embodiment, the steps of forming the backing layer and forming the opposite electrode include forming the backing layer and the opposite electrode as a unitary structure; and the method further includes forming a plurality of receiving electrodes and a plurality of receiving detection circuits electrically coupled to the plurality of receiving electrodes on a side of the piezoelectric layer proximal to the back plate, such that each receiving detection circuit includes a diode and a transistor for each receiving electrode, and the transistor includes an active layer, a first electrode and a second electrode; the diode includes a third electrode and a fourth electrode; the first electrode and the second electrode of the transistor, the third electrode and the fourth electrode of the diode and the plurality of signal leads are formed simultaneously by a single patterning process.

REFERENCE SIGNS

1. back plate; 2. sounding structure; 21. emitting electrode; 210. hollowed-out region; 22. receiving electrode; 23. piezoelectric layer; 24. signal lead; 3. backing layer; 4. receiving detection circuit; 41. diode; 411. first region; 410. second region; 412. third electrode; 413. fourth electrode; 42. transistor; 420. active layer; 423. gate; 421. first electrode; 422. second electrode; 5. first insulating layer; 6. second insulating layer; 7. third insulating layer; 8. fourth insulating layer; 9. fifth insulating layer; 10. sixth insulating layer.

DETAILED DESCRIPTION

In order to make one of ordinary skill in the art understand the technical solutions of the present disclosure better, an ultrasonic sensor and a method for driving an ultrasonic sensor and a method for manufacturing an ultrasonic sensor of the present disclosure are described in further detail below with reference to the accompanying drawings and the detailed description.

Figure 1:
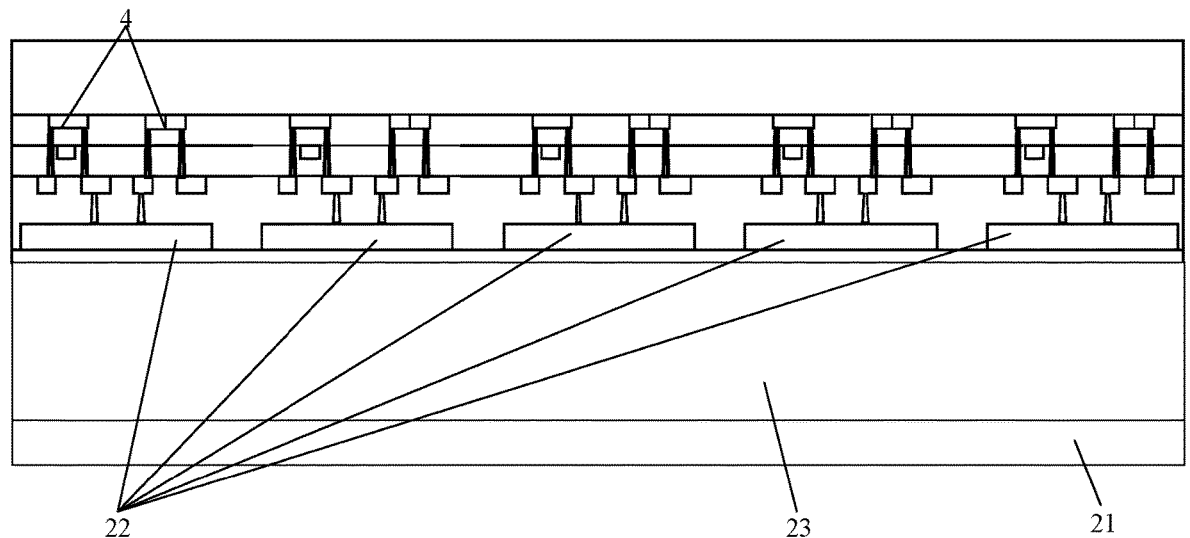
FIG. 1 is a cross-sectional view of a structure of an ultrasonic sensor in the related art.

In the related art, an ultrasonic sensor includes a piezoelectric layer 23, and an emitting electrode 21 and receiving electrodes 22 disposed on both sides of the piezoelectric layer 23, as shown in FIG. 1. The ultrasonic sensor may emit ultrasonic waves and also may receive and detect the ultrasonic waves. In the ultrasonic sensor shown in FIG. 1, the emitting electrode 21 is a unitary structure, and may be, for example, a plate-shaped electrode, and the receiving electrodes 22 may be distributed in an array. When the ultrasonic sensor emits ultrasonic waves, the emitting electrode 21 of a single-piece structure can only realize a surface emitting of the ultrasonic waves (a function of a surface sound source of the ultrasonic sensor), and can't realize a function of a point sound source of the ultrasonic sensor. In an emitting stage, the receiving electrodes 22 as pixel electrodes are at a zero potential/ground potential, the emitting electrode 21 as a driving electrode is applied with an excitation pulse signal, so that there is a pulse voltage acting on the piezoelectric layer to emit ultrasonic waves; in a receiving stage, the emitting electrode 21 as the driving electrode is at a zero potential/ground potential, an ultrasonic echo signal acts on the piezoelectric layer to generate induced charges on the piezoelectric layer, and the induced charges are collected by the pixel electrodes and then enter a corresponding receiving detection circuit 4 in a back plate, such that the ultrasonic echo signals from different positions may be detected.

The present disclosure provides an ultrasonic sensor, a method for driving the same, and a method for manufacturing the same, in order to solve the problem that the existing ultrasonic sensor cannot be used as the point sound source. In the ultrasonic sensor, a conventional planar emitting electrode is divided into a plurality of patterned discrete emitting electrodes which are arranged in an array, and parts of each individual emitting electrode, receiving electrodes and the piezoelectric layer therebetween, orthographic projections of which on the back plate have an overlapping portion, may form a point sound source unit; each emitting electrode is individually coupled to a signal lead for individually applying a signal to the emitting electrode so as to make the emitting electrode be independently controlled; since driving signals with different phases are applied to different emitting electrodes such that phase delay exists among the driving signals applied to the plurality of emitting electrodes, ultrasonic waves emitted by a plurality of point sound source units generate constructive interference at a set position, so that sound intensity at the set position is increased, namely, the function of the ultrasonic sensor as a point sound source is realized at a selected position based on the constructive interference through a phase-controlled focus. The selected position may be, for example, a position on a glass surface of the back plate. However, the present disclosure is not limited thereto. The set position of the ultrasonic sensor as a point sound source may be controlled by controlling a size and position of the individual emitting electrodes and controlling the phase difference between the driving signals applied to the different emitting electrodes according to the actual application.

Figure 2:
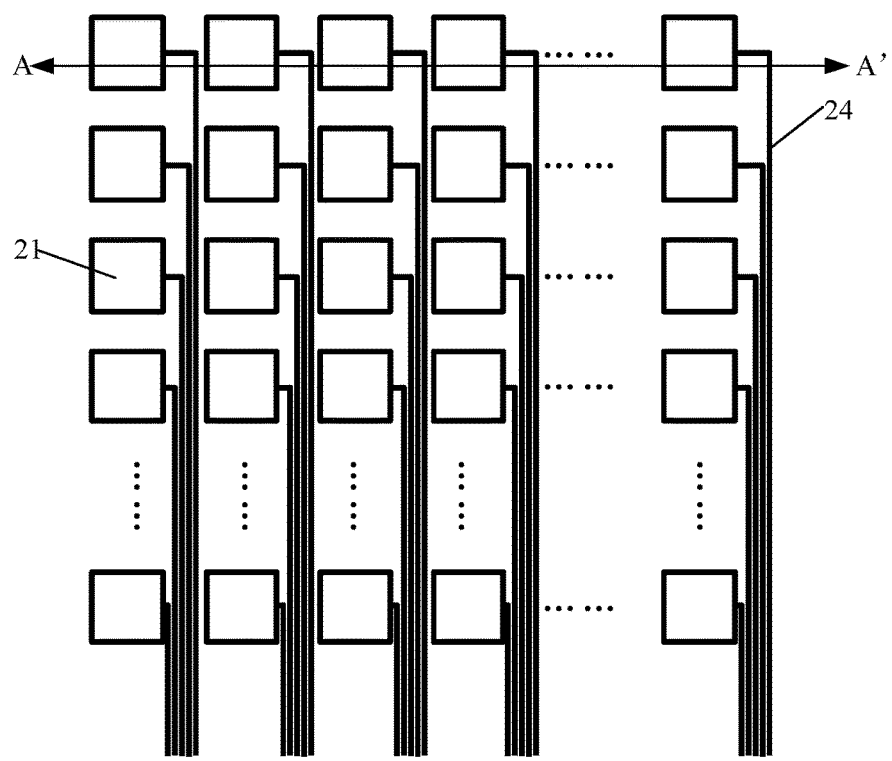
FIG. 2 is a schematic top view of a structure of an ultrasonic sensor in which a plurality of emitting electrodes and a plurality of signal leads are disposed in a same layer according to an embodiment of the present disclosure.
Figure 3:
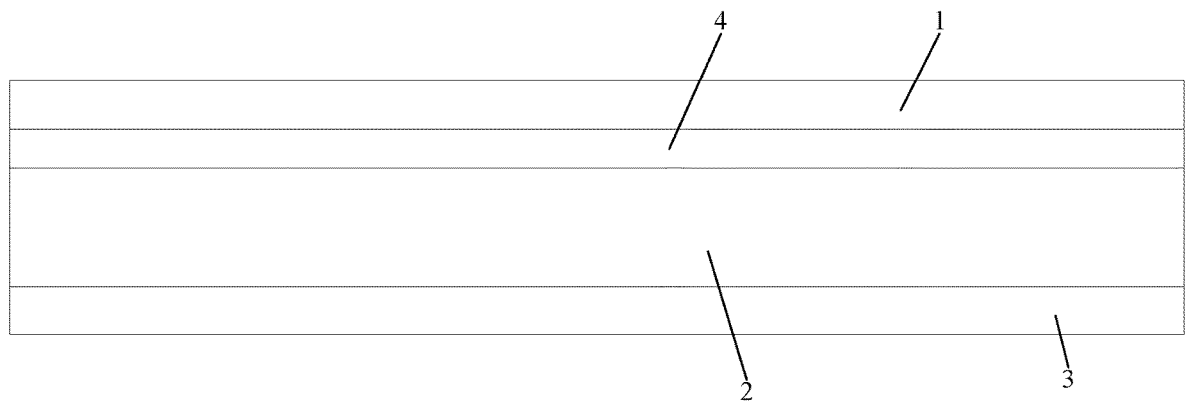
FIG. 3 is a schematic cross-sectional view of a structure of an ultrasonic sensor according to an embodiment of the present disclosure.
Figure 4:
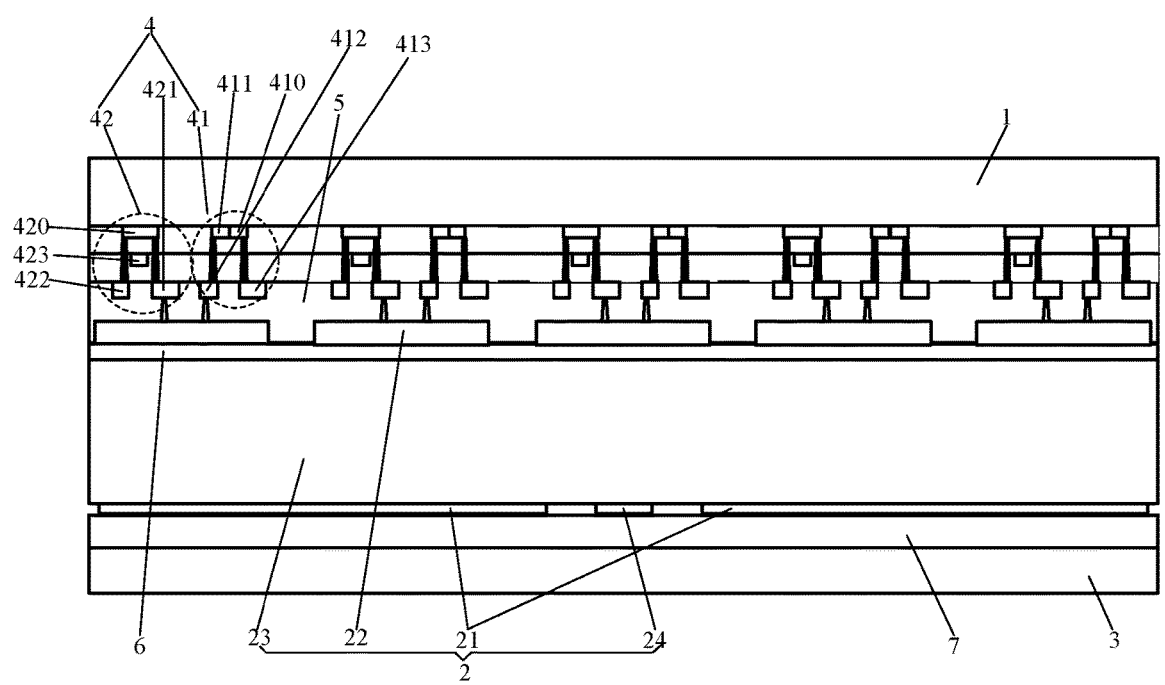
FIG. 4 is a cross-sectional view of a structure of an ultrasonic sensor according to an embodiment of the present disclosure.

An embodiment of the present disclosure provides an ultrasonic sensor, as shown in FIGS. 2 to 4, which includes a back plate 1, a sounding structure 2 disposed on the back plate 1, and a backing layer 3; the backing layer 3 is located on a side of the sounding structure 2 distal to the back plate 1; the sounding structure 2 includes a plurality of emitting electrodes 21, a plurality of receiving electrodes 22, a piezoelectric layer 23 and a plurality of signal leads 24; the plurality of emitting electrodes 21 are arranged in a same layer, the plurality of receiving electrodes 22 are arranged in a same layer; and the plurality of emitting electrodes 21 in a same layer, the plurality of receiving electrodes 22 in a same layer and the piezoelectric layer 23 are superposed one by one and located in different layers, respectively; the plurality of receiving electrodes 22 are arranged in an array, a plurality of receiving detection circuits 4 are provided on the back plate 1, the plurality of receiving detection circuits 4 are located on a side of the sounding structure 2 proximal to the back plate 1, and the plurality of receiving electrodes 22 are coupled to the receiving detection circuits 4, and the plurality of emitting electrodes 21 are arranged in an array, and the plurality of emitting electrodes 21 are coupled to the plurality of signal leads 24, respectively.

Figure 13:
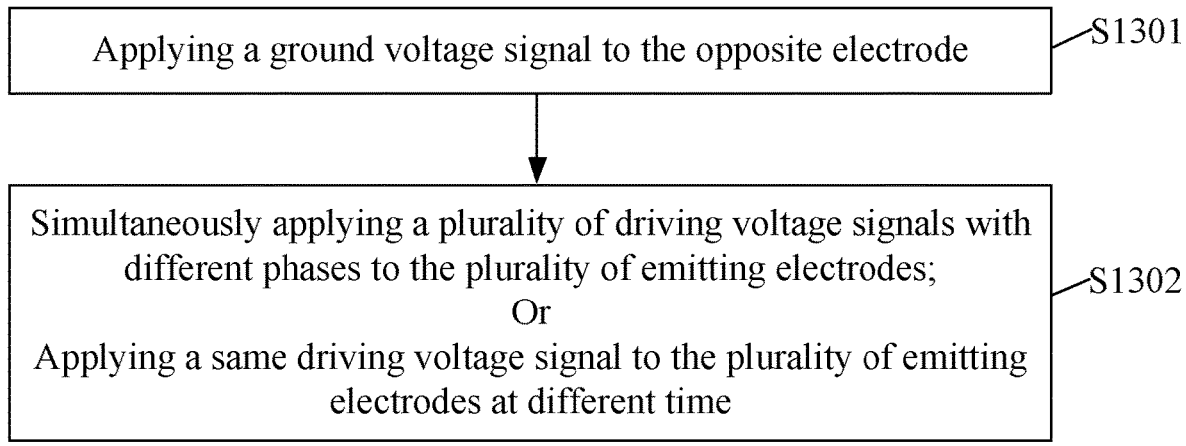
FIG. 13 is a method for driving an ultrasonic sensor according to an embodiment of the present disclosure.

The plurality of emitting electrodes 21 are provided as a plurality of patterned electrodes arranged in an array and each emitting electrode 21 is individually coupled to one signal lead 24, such that an independent control for each patterned emitting electrode may be achieved, as shown in FIG. 2. In a stage of emitting a sound source signal (such as ultrasonic wave) by the ultrasonic sensor, as shown in FIG. 13, at step S1301, the receiving electrodes 22 are at a zero potential or ground potential, an excitation pulse signal is applied to an emitting electrode 21, so that there is a pulse voltage acting on the piezoelectric layer 23, and the piezoelectric layer 23 deforms under the action of a voltage difference between the emitting electrode 21 and the receiving electrodes 22, thereby emitting the sound source signal; the excitation pulse signals with different phases are applied to different emitting electrodes 21, so that phase delay exists among the excitation pulse signals on the emitting electrodes 21, and a phase-controlled focus is generated at a certain selected position as a focusing position based on constructive interference, so that the ultrasonic sensor is realized as a point sound source.

The principle of the phase-controlled focus is as follows: a sound path from each emitting electrode 21 to the focusing position depends on time for applying the excitation pulse signal to the emitting electrode 21; specifically, a difference between time when applying an excitation pulse signal to an emitting electrode 21 of any two emitting electrodes 21 and time when applying an excitation pulse signal to the other emitting electrode 21 is proportional to a difference between a sound path from the emitting electrode 21 to the focusing position and a sound path from the other emitting electrode 21 to the focusing position; and the delay time is calculated according to a difference between sound paths from the emitting electrodes 21 to the focusing position. For example, at step S1302 of FIG. 13, a same excitation pulse signal is applied to respective emitting electrodes 21 at different times, that is, the emitting electrodes 21 are excited at different times, so as to emit ultrasonic signals with phase differences, and the ultrasonic signals have a same phase when reaching the focusing position, so that an interference enhancement is realized, thereby obtaining focusing, and therefore the ultrasonic sensor is realized as a point sound source. Alternatively, excitation pulse signals with different phases are simultaneously applied to the respective emitting electrodes 21, so that the emitting electrodes may also emit ultrasonic signals with phase differences, and the ultrasonic signals have a same phase when reaching the focusing position, so that an interference enhancement is realized, thereby obtaining focusing, and the ultrasonic sensor is realized as a point sound source.

That is, in the present disclosure, an excitation pulse signal may be successively applied to the plurality of emitting electrodes 21 arranged in an array, so that the plurality of emitting electrodes 21 may be considered to have been applied with the excitation pulse signals having a specific time difference therebetween, or excitation pulse signals with a specific phase difference are simultaneously applied to the plurality of emitting electrodes 21, so that each emitting electrode 21 of a single sound source unit can be regarded as applied with an excitation pulse signal with a specific phase difference. Therefore, these emitting electrodes 21 emit ultrasonic signals with specific phase difference, which will respectively transmit along specific sound paths to compensate the phase difference by the specific sound path difference, so that when the ultrasonic signals converge to the focus position, these ultrasonic signals will have the same phase, and interfere with each other at the focus position is achieved and the whole ultrasonic sensor may function as a point sound source.

For example, the focus position may be on the surface of the back plate, and a display unit may be alternatively arranged above the ultrasonic sensor of the present disclosure, and the receiving electrodes of the ultrasonic sensor may be shared as pixel electrodes of the display unit.

In this embodiment, the plurality of receiving electrodes 22 and the plurality of emitting electrodes 21 are provided on both sides of the piezoelectric layer 23 for applying voltages to the piezoelectric layer 23 to emit ultrasonic waves, with the receiving electrodes 22 serving as the opposite electrode for the emitting electrodes 21. However, the present disclosure is not limited thereto. The function of the receiving electrode 22 is mainly to receive an ultrasonic signal and perform a detection, such as ultrasonic fingerprint recognition, and when the ultrasonic sensor is used as a point sound source, the receiving electrodes 22 may be used as an opposite electrode for the emitting electrodes 21, and used for applying voltages to the piezoelectric layer 23 together with the emitting electrodes 21 to emit ultrasonic signals. However, the present disclosure is not limited thereto. A separated opposite electrode may also be provided.

An algorithm for calculating the delay time according to the difference between sound paths from any two emitting electrodes 21 to the focusing position is a conventional algorithm, and is not described herein.

In an embodiment, an orthographic projection of one emitting electrode 21 on the back plate 1 corresponds to an orthographic projection of an array of n×n receiving electrodes 22 on the back plate 1; where n is any one of 1 to 9. The emitting electrode 21 may be a square or circular electrode. The present disclosure is not limited thereto, and the emitting electrode of a desired shape may be provided according to actual applications. For example, one emitting electrode 21 may correspond to one array of 3×3, 5×5 or 7×7 receiving electrodes, and the number of receiving electrodes in the array corresponding to one emitting electrode 21 may be determined according to point focusing requirements, which mainly includes focusing energy and focusing width. A size of the emitting electrode 21 may be equal to be a size of 3×3 receiving electrodes in an array, in view of the focusing energy (i.e., focusing peak) and the focusing width (i.e., focal point width). It should be noted that the size of the emitting electrode 21 depends on the size of each receiving electrode in the array of the receiving electrodes. As shown in FIG. 4, the plurality of emitting electrodes 21 may be disposed in a same layer, and the plurality of receiving electrodes 22 may be disposed in a same layer, but the present disclosure is not limited thereto. The emitting electrodes 21 and the receiving electrodes 22 may be disposed in a plurality of layers according to practical applications. The purpose of disposing the plurality of emitting electrodes 21 in a same layer and disposing the plurality of receiving electrodes 22 in a same layer is to apply excitation pulse signals having a certain phase difference to the respective emitting electrodes 21 more easily and apply a zero potential or ground potential as a reference signal to the respective receiving electrodes 22 more easily, so as to realize an ultrasonic sensor as a point sound source. In fact, the plurality of emitting electrodes 21 and the plurality of receiving electrodes 22 may be provided in different layers, as long as the excitation signals and the reference signal are applied in accordance with a positional relationship among the piezoelectric layer, the plurality of emitting electrodes 21, and the plurality of receiving electrodes 22.

Figure 11:
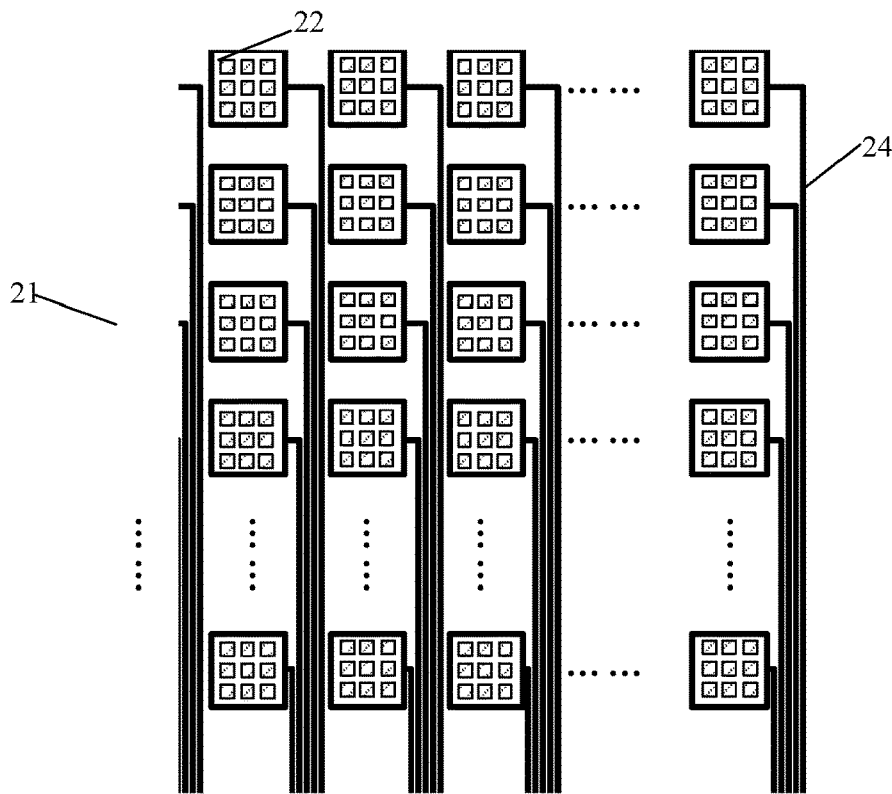
FIG. 11 is a schematic top view of a structure of a plurality of emitting electrodes and a plurality of receiving electrodes in an ultrasonic sensor according to an embodiment of the present disclosure.

As shown in FIG. 11, the plurality of emitting electrodes 21 are arranged in an array in a same layer, and the plurality of receiving electrodes 22 are arranged in an array in a same layer, and there is a partial overlap between the orthographic projections of each emitting electrode 21 in a layer and corresponding receiving electrodes 22 in the other layer on the back plate. For example, FIG. 11 shows that an orthographic projection of each emitting electrode 21 on the back plate may cover an orthographic projection of 3×3 emitting electrodes on the back plate.

Figure 12:
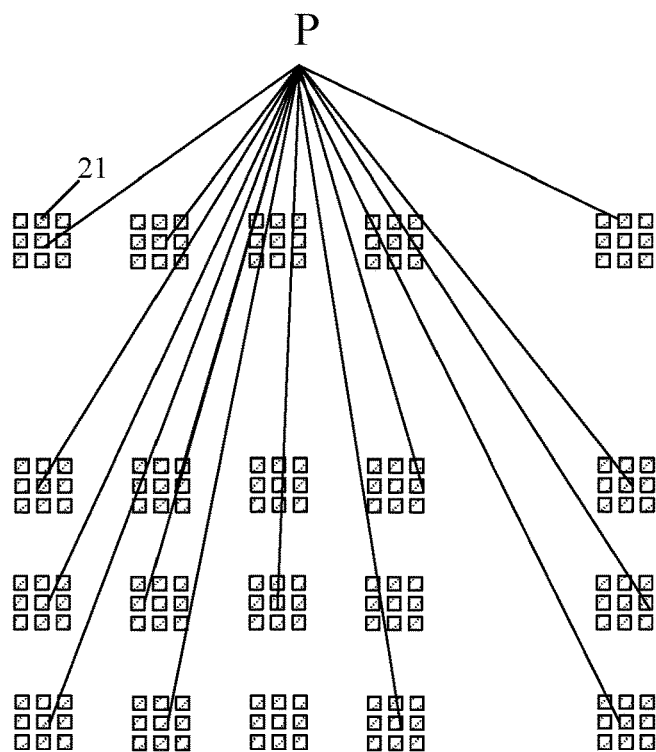
FIG. 12 is a schematic view of a focal position of an ultrasonic sensor according to an embodiment of the present disclosure.

In the present disclosure, parts of each emitting electrode 21, the corresponding receiving electrodes 22 and the piezoelectric layer 23 between the emitting electrode 21 and the corresponding receiving electrodes 22, orthographic projections of which on the back plate 1 have an overlapping portion, constitute one point sound source unit, for example, a size of each emitting electrode 21 in FIG. 11 may be approximately regarded as a size of one point sound source unit. The phase differences of the excitation pulse signals applied to the respective emitting electrodes 21 in the point sound source units are controlled so that the point sound source units emit ultrasonic signals with phase differences, and the ultrasonic signals with phase differences will have a same potential at a certain position on the back plate 1 due to different distances to the focusing position, so that constructive interference is realized, and focusing is achieved at the position. That is, the entire focusing process may be considered to be phase-controlled focus. As shown in FIG. 12, ultrasonic signals emitted by the plurality of point sound source units are focused as a focus position P, so that the ultrasonic sensor functions as a point sound source. Specifically, a sound path difference between any two point sound source units may be calculated based on distances from the point sound source units to the focus position P, thereby obtaining the phase difference between excitation signals applied to the point sound source units, thus individually controlling the signals applied to each emitting electrode. For example, when the focusing position P is at a middle position on or above the back plate 1, the excitation signals may be applied to the emitting electrodes at an edge firstly, and then, the excitation signals may be gradually applied from the emitting electrodes at the edge to the emitting electrodes at the central position according to the phase differences calculated from the sound path differences, so that the ultrasonic signals emitted by the point sound source units have a same phase at the focusing position, thereby achieving an enhanced interference and achieving focusing at the focusing position.

Figure 7:
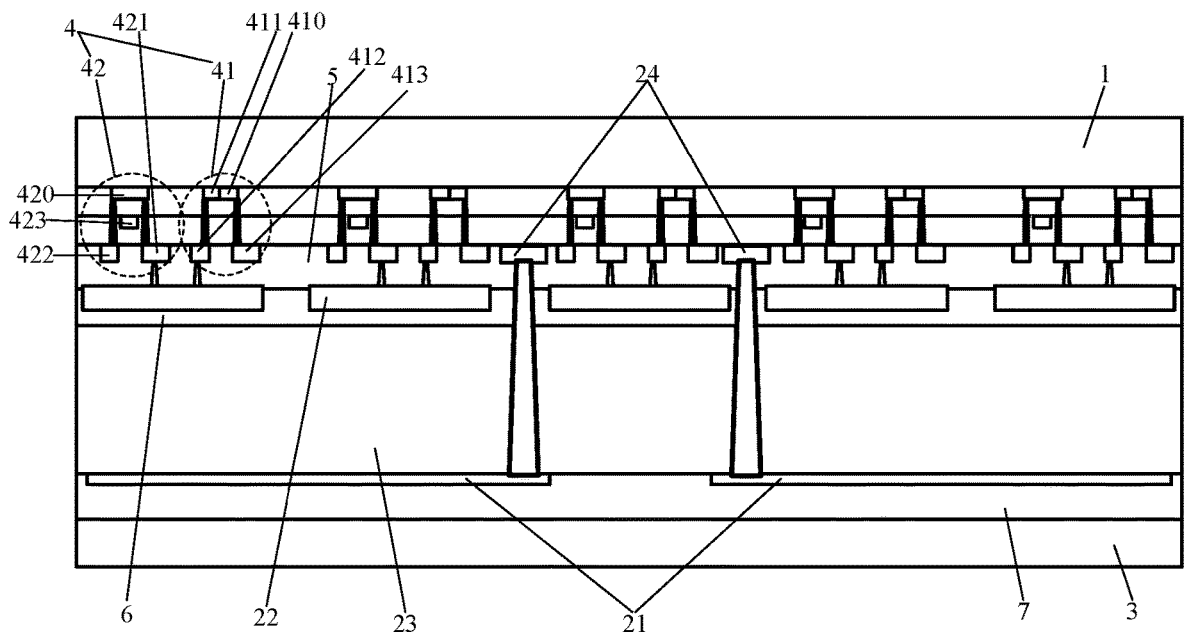
FIG. 7 is a cross-sectional view of a structure of an ultrasonic sensor according to an embodiment of the present disclosure.
Figure 8:
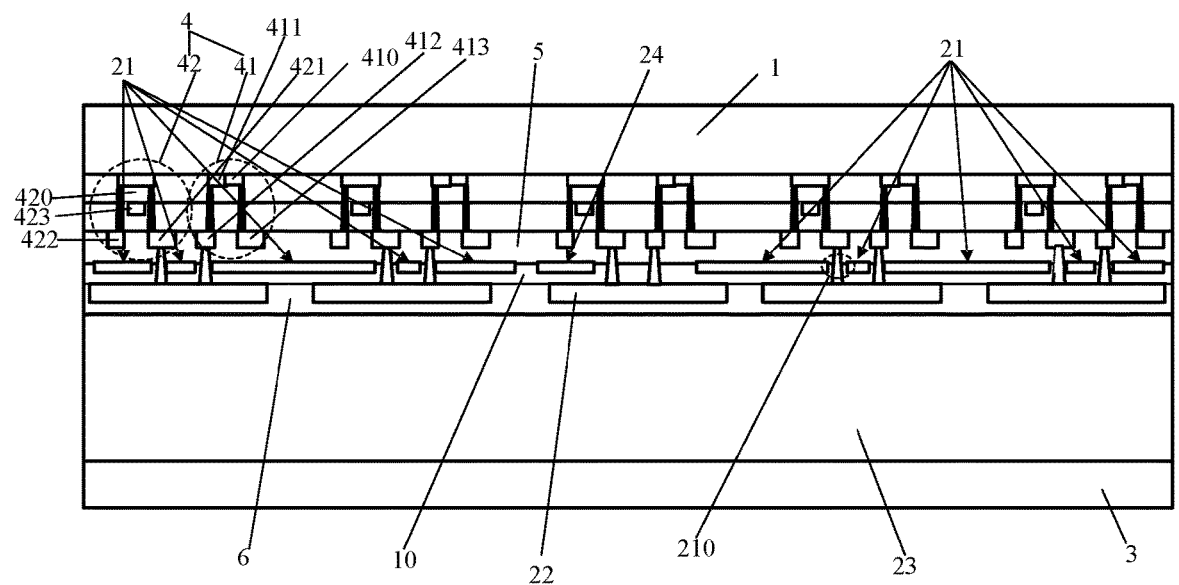
FIG. 8 is a cross-sectional view of a structure of an ultrasonic sensor according to an embodiment of the present disclosure.
Figure 10:
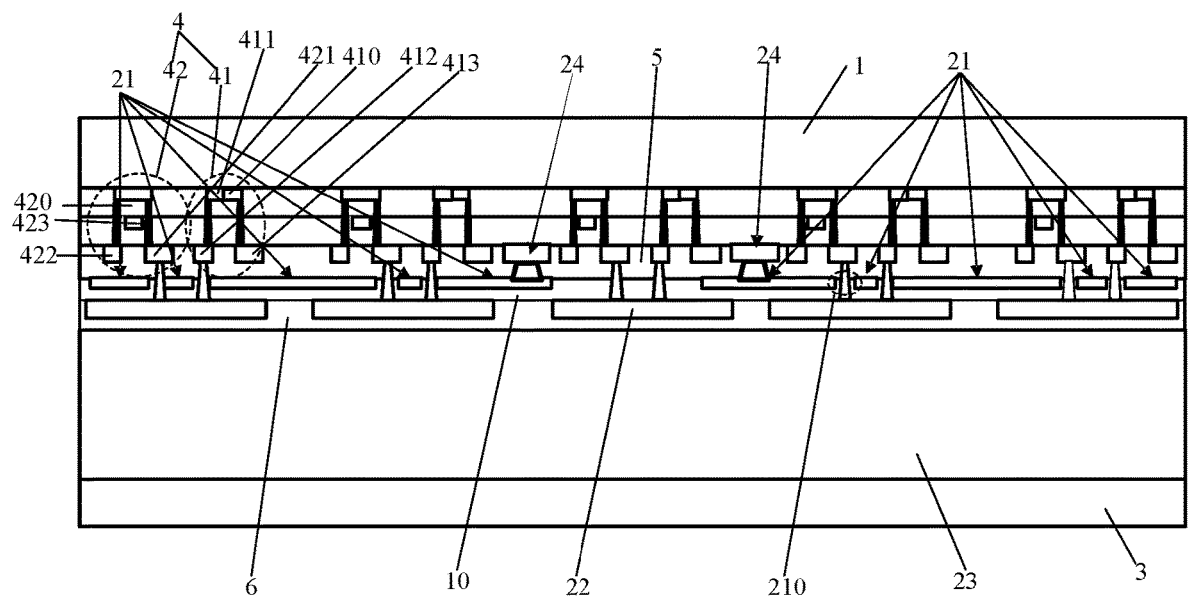
FIG. 10 is a cross-sectional view of a structure of an ultrasonic sensor according to an embodiment of the present disclosure.

It should be noted that, FIG. 11 illustrates only one example of the present disclosure, and the present disclosure is not limited thereto. Since the plurality of emitting electrodes 21 and the plurality of receiving electrodes 22 may be arranged in different layers, the plurality of emitting electrodes 21 and the plurality of receiving electrodes 22 may be uniformly arranged in the respective layers as shown in FIGS. 7,8 and 10. In such a configuration of a uniform layout, only the part of the emitting electrode which has an overlapping with the receiving electrode in the direction perpendicular to the back plate may emit the ultrasonic waves, and the part of the emitting electrode which has no overlapping with the receiving electrode in the direction perpendicular to the back plate may not emit the ultrasonic waves.

It should be noted that, in the present disclosure, the emitting electrodes 21 of the ultrasonic sensor for emitting the sound source signals are improved to implement the point sound source of the ultrasonic sensor. The receiving detection circuits 4 detect sound source signals received by the receiving electrodes when the ultrasonic sensor receives the sound source signals, thereby implementing a function of sensing the sound source signals. Since the ultrasonic sensor has both a function of emitting the sound source signals and a function of sensing the sound source signals, the receiving detection circuits 4 may be integrated in the ultrasonic sensor.

Based on the ultrasonic sensor with the above structure, the present disclosure also provides a driving method for the ultrasonic sensor, which includes applying a ground voltage signal to the plurality of receiving electrodes, and applying driving voltage signals with different phases to the plurality of emitting electrodes, respectively.

The driving voltage signals applied to the emitting electrodes are the excitation pulse signals. The time for applying the excitation pulse signals to different emitting electrodes may be different, so that different emitting electrodes may be excited at different time, sound source signals with phase differences may be emitted, the sound source signals have a same phase when reaching the focusing position, such that an enhanced interference is realized, focusing is realized, and the ultrasonic sensor serving as a point sound source is further realized. The excitation time difference between the two emitting electrodes is the sound path difference from the two emitting electrodes to the focusing position. Correspondingly, an excitation time difference between any two emitting electrodes may alternatively be calculated according to a sound path difference between the emitting electrodes to the focusing position.

The algorithm for calculating the excitation time difference of any two emitting electrodes according to a sound path difference between the any two emitting electrodes to the focusing position is a conventional algorithm, and is not described herein.

It should be noted that, in the present disclosure, the emitting electrodes of the ultrasonic sensor for emitting the sound source signal are modified to implement the point sound source of the ultrasonic sensor. When the ultrasonic sensor in this embodiment implements the function of point sound source, it may be necessary to apply a ground voltage signal to the receiving electrodes.

Figure 14:
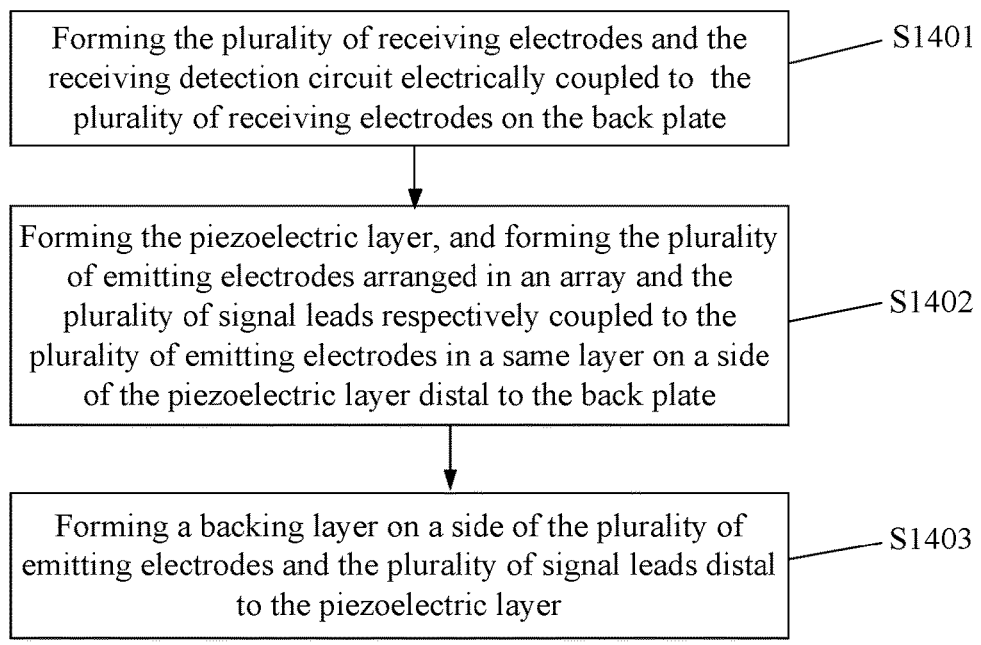
FIG. 14 is a method for manufacturing an ultrasonic sensor according to an embodiment of the present disclosure.

Based on the structure of the ultrasonic sensor, the present disclosure also provides a method for manufacturing the ultrasonic sensor, which includes forming a sounding structure and a backing layer on a back plate, the forming the sounding structure includes forming a plurality of emitting electrodes, a plurality of receiving electrodes, a piezoelectric layer and a plurality of signal leads, the plurality of emitting electrodes are arranged in a layer, the plurality of receiving electrodes are arranged in a layer, the plurality of emitting electrodes, the plurality of receiving electrodes and the piezoelectric layer are respectively formed in different layers, and the piezoelectric layer is arranged between the plurality of receiving electrodes and the plurality of emitting electrodes; the forming the plurality of receiving electrodes includes forming the plurality of receiving electrodes arranged in an array by a patterning process. In addition, the method for manufacturing an ultrasonic sensor of the present disclosure further includes, before forming the sounding structure on the back plate, forming receiving detection circuits, wherein the plurality of receiving electrodes are coupled to the receiving detection circuits, the forming the plurality of emitting electrodes and the plurality of signal leads includes forming a pattern of the plurality of emitting electrodes arranged in an array and the plurality of signal leads by a patterning process, wherein each emitting electrode is individually coupled to one signal lead, as shown in FIG. 14.

The patterning process includes steps of film formation, exposure, development, etching and the like, and patterns of the plurality of emitting electrodes and the plurality of signal leads formed by the patterning process may obtain the patterns with higher precision and patterns of thinner signal leads. The signal lead formed by a traditional screen printing process cannot be a thinner since the screen printing process generally has a precision of more than 60 μm, and it is difficult for a whole metal film layer formed by the traditional screen printing process to form the pattern of the plurality of emitting electrodes arranged in an array by the traditional etching process. Therefore, by forming the patterns of the plurality of emitting electrodes and the plurality of signal leads by the patterning process, the patterns of an array of the plurality of emitting electrodes and the patterns of the plurality of signal leads may be obtained, and the precision for forming the patterns of the emitting electrodes and the signal leads may be improved.

In addition, the receiving detection circuits may be formed by using a traditional method, and the details thereof are not repeated herein.

In an embodiment, the present disclosure provides an ultrasonic sensor, as shown in FIG. 4, which includes a back plate 1, and a sounding structure 2 disposed on the back plate 1 and a backing layer 3, wherein the backing layer 3 is located on a side of the sounding structure 2 distal to the back plate 1; the sounding structure 2 includes a plurality of emitting electrodes 21, a plurality of receiving electrodes 22, a piezoelectric layer 23 and a plurality of signal leads 24, the plurality of emitting electrodes 21, the plurality of receiving electrodes 22 and the piezoelectric layer 23 are respectively located in different layers, and the plurality of emitting electrodes 21, the plurality of receiving electrodes 22 and the piezoelectric layer 23 are superposed one by one; the plurality of receiving electrodes 22 are arranged in an array, a plurality of receiving detection circuits 4 are further arranged on the back plate 1, the receiving detection circuits 4 are located on a side of the sounding structure 2 proximal to the back plate 1, the plurality of receiving electrodes 22 are coupled to the receiving detection circuits 4, the plurality of emitting electrodes 21 are arranged in an array, and each emitting electrode 21 is individually coupled to one signal lead 24.

The plurality of emitting electrodes 21 are provided as a plurality of patterned electrodes arranged in an array and each emitting electrode 21 is individually coupled to one signal lead 24, such that an independent control for each patterned electrode may be achieved. In a stage of emitting the sound source signal (i.e., ultrasonic waves) of the ultrasonic sensor, the receiving electrodes 22 are at a zero potential or ground potential, and an excitation pulse signal is applied to the emitting electrode 21, so that there is a pulse voltage acting on the piezoelectric layer 23, and the piezoelectric layer 23 deforms under the action of a voltage difference between the emitting electrode 21 and the receiving electrodes 22 to emit the sound source signal; excitation pulse signals with different phases are applied to different emitting electrodes 21, so that phase delay exists among the excitation pulse signals on different emitting electrodes 21, and a phase-controlled focus is generated at a certain selected position based on constructive interference, therefore the ultrasonic sensor is realized as a point sound source.

The principle of the focus of the sound source signals in a phase-controlled array is as follows: a sound path from each emitting electrode 21 to a focusing position depends on the time for applying the excitation pulse signal to the emitting electrode 21; a difference between time when applying an excitation pulse signal to an emitting electrode 21 of any two emitting electrodes 21 and time when applying an excitation pulse signal to the other emitting electrode 21 is a difference between a sound path from the emitting electrode 21 to the focusing position and a sound path from the other emitting electrode 21 to the focusing position; and the delay time is calculated according to a difference between sound paths from the emitting electrodes 21 to the focusing position. Excitation pulse signals are applied to respective emitting electrodes 21 at different times, that is, the emitting electrodes 21 are excited at different times, so as to emit sound source signals with phase differences, and the sound source signals have a same phase when reaching the focusing position, so that an interference enhancement is realized, thereby obtaining focusing, and therefore the ultrasonic sensor is realized as a point sound source.

An algorithm for calculating the delay time according to the difference between sound paths from any two emitting electrodes 21 to the focusing position is a conventional algorithm, and is not described herein.

In an embodiment, the orthographic projection of one emitting electrode 21 on the back plate 1 corresponds to the orthographic projection of an array of n×n receiving electrodes 22 on the back plate 1; where n is any one of 1 to 9. The emitting electrode 21 may be a square or circular electrode. The present disclosure is not limited thereto, and the emitting electrode of a desired shape may be provided according to an actual application. For example, one emitting electrode 21 may correspond to one array of 3×3, 5×5 or 7×7 receiving electrodes 22, and a size of the array of receiving electrodes corresponding to one emitting electrode 21 (i.e., the number of receiving electrodes 22 in the array of receiving electrodes 22) may be determined according to the point focusing requirements, which may mainly include focusing energy and focusing width. A size of the emitting electrode 21 is equal to be a size of 3×3 receiving electrodes 22 in an array, in view of the focusing energy (i.e., focusing peak) and the focusing width (i.e., focal point width). It should be noted that the size of the emitting electrode 21 depends on the size of each receiving electrode 22 in the array of the receiving electrodes 22.

In the ultrasonic sensor of the embodiment shown in FIG. 4, the receiving detection circuit 4 includes a diode 41 and a transistor 42, the transistor 42 includes an active layer 420, a first electrode 421, a second electrode 422, and a gate electrode 423, the diode 41 includes a third electrode 412 and a fourth electrode 413, the first electrode 421 and the second electrode 422 of the transistor 42 and the third electrode 412 and the fourth electrode 413 of the diode 41 may be provided in a same layer and made of a same material, e.g., a conductive material such as a metal or ITO; and a first insulating layer 5 is provided between the sounding structure 2 and the first electrode 421 and the second electrode 422 of the transistor 42 and the third electrode 412 and the fourth electrode 413 of the diode 41; the emitting electrodes 21 are located on a side of the piezoelectric layer 23 distal to the back plate 1, the receiving electrodes 22 are located on a side of the piezoelectric layer 23 proximal to the back plate 1, and a second insulating layer 6 is provided between the receiving electrodes 22 and the piezoelectric layer 23; the first electrode 421 of the transistor 42 and the third electrode 412 of the diode 41 are coupled to the receiving electrode 22 by via holes in the first insulating layer 5, respectively. In addition, the active layer 420 of the transistor 42 and a P-type semiconductor and an N-type semiconductor of the diode 41 may be disposed in a same layer. For example, when the transistor 42 is an N-type transistor, the active layer 420 and the N-type semiconductor may be arranged in a same layer and may be formed by a same process.

The first and second electrodes 421 and 422 of the transistor 42 may be a source and a drain of the transistor, respectively, and the third and fourth electrodes 412 and 413 of the diode 41 may be input and output electrodes of the diode 41, respectively. In the present disclosure, the emitting electrodes 21 of the ultrasonic sensor are improved to realize a function of a point sound source of the ultrasonic sensor, but a part of the ultrasonic sensor that receives and detects the sound source signals (the receiving detection circuits 4) is not improved, and a specific configuration of the diodes 41 and the transistors 42 in the receiving detection circuits 4 may be determined according to the reception and detection for the sound source signals by the ultrasonic sensor, and may adopt the currently mature technique, which are not described herein again. Only the position of the receiving detection circuits 4 is schematically described herein.

In this embodiment, the signal leads 24 and the emitting electrodes 21 are disposed in a same layer; a third insulating layer 7 may be provided between the emitting electrodes 21 and the backing layer 3. The third insulating layer 7 is used for separating the emitting electrodes 21 and the signal leads 24 from the backing layer 3. Comparing with the case in which the backing layer serves as both the emitting electrode and a backing layer in the ultrasonic sensor with a whole-piece emitting electrode in the related art, the backing layer 3 in the embodiment only serves as the backing layer for absorbing and reflecting the sound source signals (such as ultrasonic waves), thereby enhancing the emitting effect of the sound source signals.

For example, FIG. 4 illustrates a cross-sectional schematic view of the ultrasonic sensor shown in FIG. 2 taken along a line AA'. As shown in FIG. 2, each of the emitting electrodes 21 in the rows and columns of emitting electrodes 21 arranged in an array is individually controlled by one signal lead 24, i.e., each emitting electrode 21 was individually applied with an excitation voltage signal through one signal lead 24. In the embodiment shown in FIG. 4, the plurality of emitting electrodes 21 and the plurality of signal leads 24 may be arranged in a same layer and formed by a same patterning process using a same metal material. FIG. 4 shows only a cross-sectional view taken along line AA' of FIG. 2, in which only one signal lead 24 is provided between two adjacent emitting electrodes 21, which shows only the case in the first row. For the emitting electrodes 21 in the second row, there are two signal leads 24 between every two adjacent emitting electrodes 21; for the emitting electrodes 21 in the third row, three signal leads 24 exist between every two adjacent emitting electrodes 21, and so on. The closer a distance from the position where the signal leads 21 are externally coupled with the control circuit is, the greater the number of the signal leads 24 arranged between every two adjacent emitting electrodes 21 is.

In the present embodiment, the emitting electrode 21 and the signal lead 24 each include a metallic conductive material, and the backing layer 3 includes, for example, silver. For the backing layer 3 made of silver, the backing layer 3 formed by a traditional screen-printing process may have silver paste backing layer 3 with a larger thickness, and the backing layer 3 has better absorption and reflection effects on sound source signals and enhances an emitting effect of the sound source signals.

Based on the ultrasonic sensor with the above structure, the present embodiment further provides a driving method for the ultrasonic sensor, which is the same as the driving method for the ultrasonic sensor in the above embodiment and is not described herein again.

Based on the ultrasonic sensor with the above structure, this embodiment further provides a method for manufacturing the ultrasonic sensor, and on the basis of the method for manufacturing the ultrasonic sensor in the above embodiment, the method for manufacturing the ultrasonic sensor in this embodiment further includes forming patterns of the plurality of the emitting electrodes and the plurality of signal leads simultaneously by a single patterning process. Since the plurality of emitting electrodes and the plurality of signal leads are arranged in a same layer in the embodiment, the number of process steps in the method may be saved by simultaneously forming the patterns of the plurality of emitting electrodes and the plurality of signal leads by using a single patterning process, and a process cost may be reduced. The emitting electrode and the signal lead may be made of a same conductive material, as shown in FIG. 14.

In addition, in the method for manufacturing the sensor according to the embodiment, the step of forming the receiving detection circuits includes forming a diode and a transistor, and the step of forming the transistor includes forming a gate, a first electrode, and a second electrode; the step of forming the diode includes a step of forming a third electrode and a fourth electrode; the method further includes after the step of forming the receiving detection circuits and before the step of forming the sounding structure, the step of forming the first insulating layer and the via holes therein (the via hole through which the first electrode of the transistor and the third electrode of the diode are coupled to the receiving electrode).

The forming the sounding structure includes forming the receiving electrodes, the piezoelectric layer, and the emitting electrodes on the back plate on which the first insulating layer is formed. The method for forming respective layers of the sounding structure is a traditional process, and is not described herein again. The method for manufacturing the ultrasonic sensor of the embodiment of the present disclosure further includes forming a second insulating layer after forming the receiving electrodes and before forming the piezoelectric layer; forming a third insulating layer after forming the emitting electrodes and before forming the backing layer.

In this embodiment, the backing layer is formed of silver paste by using a traditional screen-printing process. The traditional screen-printing process may form a silver paste film layer with a larger thickness, so that the backing layer has better absorption and reflection effects on sound source signals, and the emitting effect of the sound source signals is enhanced.

It is noted that, the backing layer of the present disclosure may also be formed using a traditional patterning process.

Figure 5:
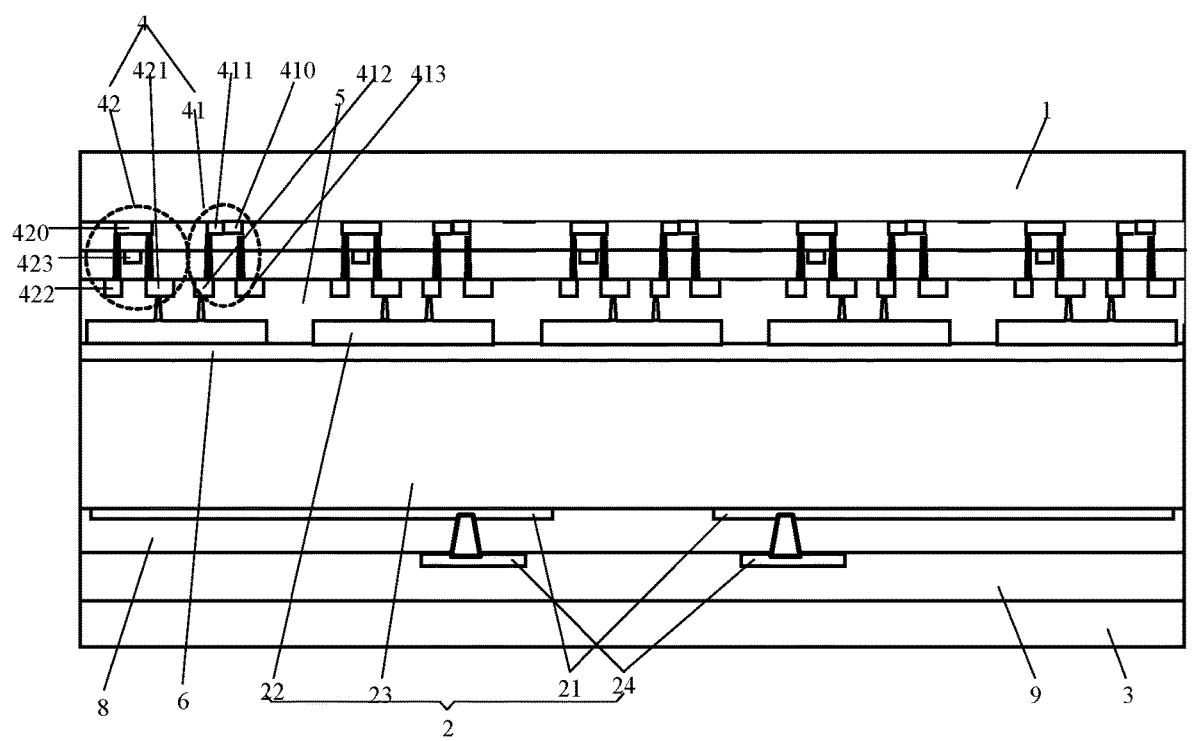
FIG. 5 is a cross-sectional view of a structure of an ultrasonic sensor according to an embodiment of the present disclosure.
Figure 6:
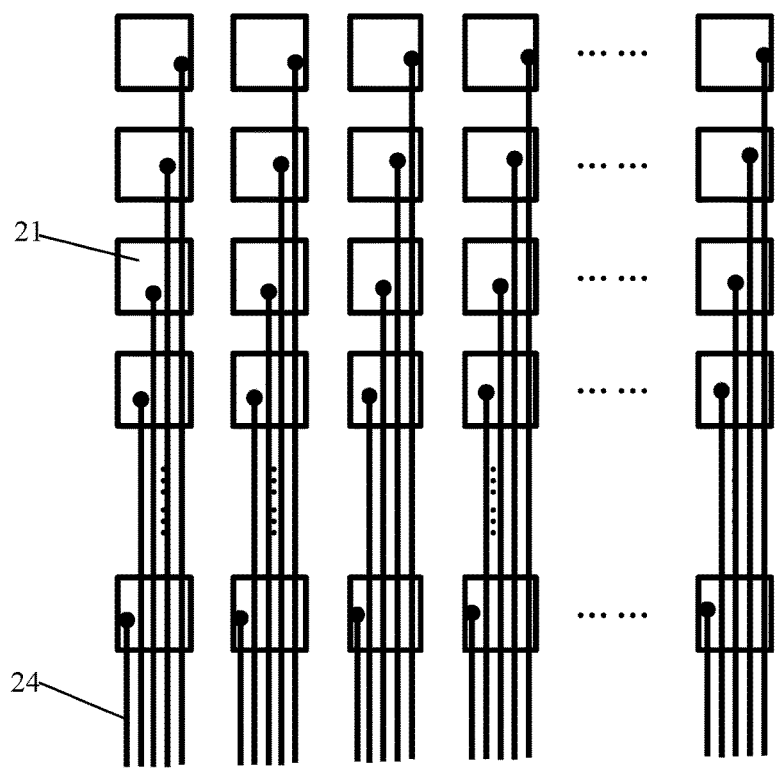
FIG. 6 is a schematic top view of a structure of an ultrasonic sensor in which a plurality of emitting electrodes and a plurality of signal leads are disposed in different layers according to an embodiment of the present disclosure.

On the basis of the structure of the ultrasonic sensor of the embodiment shown in FIG. 4, in the ultrasonic sensor of the embodiment shown in FIGS. 5 and 6, the plurality of signal leads 24 are located on a side of the plurality of emitting electrodes 21 distal to the piezoelectric layer 23, and a fourth insulating layer 8 is further provided between the plurality of emitting electrodes 21 and the plurality of signal leads 24; the plurality of signal leads 24 are coupled to the plurality of emitting electrodes 21 through via holes in the fourth insulating layer 8; a fifth insulating layer 9 is provided between the plurality of signal leads 24 and the backing layer 3.

Comparing with the embodiment shown in FIG. 4 in which the plurality of emitting electrodes 21 and the plurality of signal leads 24 are arranged in a same layer, the plurality of signal leads 24 are individually provided in a layer such that each of the plurality of emitting electrodes 21 is individually coupled to one signal lead 24, which may avoid an insufficient wiring space on the layer in which the patterned emitting electrodes 21 are provided, ensure that respective emitting electrodes 21 are individually led out through different signal leads 24, and thereby ensure the accuracy of driving voltage signals applied on the plurality of emitting electrodes 21, and further promote the point sound source function of the ultrasonic sensor.

Other structures of the ultrasonic sensor in this embodiment are the same as those in the embodiment shown in FIG. 4, and are not described herein again.

The method for driving the ultrasonic sensor in this embodiment is the same as that in the embodiment shown in FIG. 4, and is not described herein again.

Based on the above structure of the ultrasonic sensor, the present embodiment further provides a method for manufacturing the ultrasonic sensor, which is different from the method of the embodiment shown in FIG. 4 in that the method for manufacturing the ultrasonic sensor of the present embodiment includes forming patterns of the plurality of emitting electrodes and the plurality of signal leads by using two patterning processes, respectively.

In addition, the method for manufacturing the ultrasonic sensor in this embodiment further includes forming a fourth insulating layer and via holes therein (through which the plurality of emitting electrodes are coupled to the plurality of signal leads, respectively), after forming the plurality of emitting electrodes and before forming the plurality of signal leads; the method further includes forming a fifth insulating layer after forming the plurality of signal leads and before forming the backing layer.

Other steps of the method for manufacturing the ultrasonic sensor in this embodiment are the same as those in the embodiment shown in FIG. 4, and are not repeated herein.

On the basis of the structure of the ultrasonic sensor of the embodiment shown in FIG. 4, the present embodiment provides an ultrasonic sensor, which is different from the embodiment shown in FIGS. 5 and 6 in that, as shown in FIG. 7, a plurality of signal leads 24 and the first and second electrodes 421 and 422 of the transistor 42 are made of a same material and are disposed in a same layer, and the plurality of signal leads 24 are coupled to the plurality of emitting electrodes 21 through via holes in the first insulating layer 5, the second insulating layer 6, and the piezoelectric layer 23, respectively; a third insulating layer 7 is also provided between the plurality of emitting electrodes 21 and the backing layer 3.

The plurality of signal leads 24 and the first electrode 421 of the transistor 42 are made of a same material and are arranged in a same layer, so that the process steps may be saved, the process cost may be reduced, and further, the wiring space on the layer in which the patterned emitting electrodes 21 are provided may be prevented from being insufficient, and it ensures that respective emitting electrodes 21 are individually led out through different signal leads 24, and thereby ensure the accuracy of driving voltage signals applied on the plurality of emitting electrodes 21, and further promote the point sound source function of the ultrasonic sensor.

Other structural configurations of the ultrasonic sensor in this embodiment are the same as those in the embodiment shown in FIG. 4, and are not described herein again.

The method for driving the ultrasonic sensor in this embodiment is the same as that in the embodiment shown in FIG. 4, and is not described herein again.

Based on the structure of the sensor shown in FIG. 7, the present embodiment further provides a method for manufacturing an ultrasonic sensor, which is different from the method for manufacturing the ultrasonic sensor in the embodiment shown in FIG. 4 in that, the plurality of signal leads and the first and second electrodes of the transistor and the third and fourth electrodes of the diode in this embodiment may be simultaneously formed by a single patterning process.

In addition, while the pattern of the first insulating layer is formed, a first via portion (a first portion of the via hole through which the signal lead is coupled to the emitting electrode) may also be formed in the first insulating layer; while the pattern of the second insulating layer is formed, a second via portion (a second portion of the via hole through which the signal lead is coupled to the emitting electrode) may be formed in the second insulating layer; while the pattern of the piezoelectric layer is formed, a third via portion (a third portion of the via hole through which the signal lead is coupled to the emitting electrode) may be formed in the piezoelectric layer; and the first portion, the second portion, and the third portion are communicated with each other to form the via hole through which the signal lead is coupled to the emitting electrode.

Other steps of the method for manufacturing the ultrasonic sensor in this embodiment are the same as those in the embodiment shown in FIG. 4, and are not described herein again.

On the basis of the structure of the ultrasonic sensor in the embodiment shown in FIG. 4, the present embodiment provides an ultrasonic sensor, which is different from the embodiments shown in FIGS. 4 to 7, as shown in FIG. 8, each receiving detection circuit 4 includes a diode 41 and a transistor 42 for each receiving electrode 22, the transistor 42 includes an active layer 420, a first electrode 421, a second electrode 422 and a gate 423, the diode 41 includes a third electrode 412 and a fourth electrode 413; the first electrode 421 and the second electrode 422 of the transistor 42 and the third electrode 412 and the fourth electrode 413 of the diode 41 are made of a same material and are arranged in a same layer, and a first insulating layer 5 is arranged between the sounding structure 2 and the first electrode 421 and the second electrode 422 of the transistor 42 and the third electrode 412 and the fourth electrode 413 of the diode 41; the plurality of receiving electrodes 22 are located on a side of the piezoelectric layer 23 proximal to the back plate 1, the plurality of emitting electrodes 21 are located on a side of the plurality of receiving electrodes 22 proximal to the back plate 1; a second insulating layer 6 is arranged between the plurality of receiving electrodes 22 and the piezoelectric layer 23, and a sixth insulating layer 10 is arranged between the plurality of emitting electrodes 21 and the plurality of receiving electrodes 22. No insulating layer needs to be provided between the piezoelectric layer 23 and the backing layer 3.

In the embodiment shown in FIG. 8, the opposite electrode opposite to the plurality of emitting electrodes 21 is the backing layer 3, which may be made of screen printed silver paste as described above. The plurality of emitting electrodes 21 and the backing layer 3 are arranged on two sides of the piezoelectric layers 23, respectively, for applying driving voltage signals to the piezoelectric layers 23, in this embodiment. The backing layer 3 in this embodiment may be configured such that when emitting the ultrasonic signals, a zero potential is applied to the backing layer 3 of the ultrasonic sensor, which is in cooperation with excitation signals with phase difference applied to the plurality of emitting electrodes 21 such that the ultrasonic sensor is used as a point sound source. The backing layer 3 is also configured as an acoustic backing. In this embodiment, each point sound source unit is an overlapping portion of orthographic projections of the backing layer 3 as the opposite electrode, the piezoelectric layer 23, and each emitting electrode on the back plate 1. That is, the sound source unit has a size which is about the size of the orthographic projection of each emitting electrode on the back plate 1.

In this embodiment, similar to the previous embodiments, by controlling the phase difference of the excitation signals applied to the plurality of emitting electrodes 21 so that a plurality of ultrasonic signals having the phase difference are generated and have a same phase at the focus position through a specific sound path difference, the constructive interference occurs, such that the ultrasonic sensor is used as a point sound source emitting ultrasonic waves.

Figure 9:
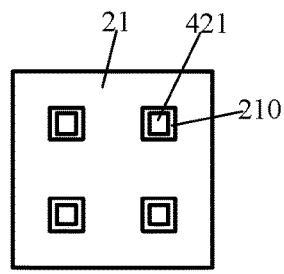
FIG. 9 is a schematic top view of a structure of a plurality of emitting electrodes of an ultrasonic sensor according to an embodiment of the present disclosure.

In this embodiment, the plurality of signal leads 24 and the plurality of emitting electrodes 21 are arranged in a same layer; as shown in FIG. 9, hollowed-out regions 210 may be provided in each emitting electrode 21; a material of the sixth insulating layer is filled in the hollowed-out regions 210, and the first electrode 421 of the transistor 42 and the third electrode 412 of the diode 41 are respectively coupled to the receiving electrode 22 through the via holes in the material of the sixth insulating layer 10 in the hollowed-out regions 210 and the first insulating layer 5.

The plurality of emitting electrodes 21 and the plurality of signal leads 24 may be made of a metal conductive material, and the backing layer 3 may be made of silver.

It should be noted that, in this embodiment, the plurality of signal leads and the plurality of emitting electrodes may alternatively be disposed in different layer. As in the embodiment shown in FIG. 5, the plurality of signal leads and the plurality of emitting electrodes are electrically coupled to each other through via holes in an insulating layer disposed therebetween, and the details are not repeated herein.

Other structures of the ultrasonic sensor in this embodiment are the same as those of the embodiment shown in FIG. 4, and are not described herein again.

The method for driving the ultrasonic sensor in this embodiment is the same as the embodiment shown in FIG. 4, and the description thereof is omitted.

Figure 15:
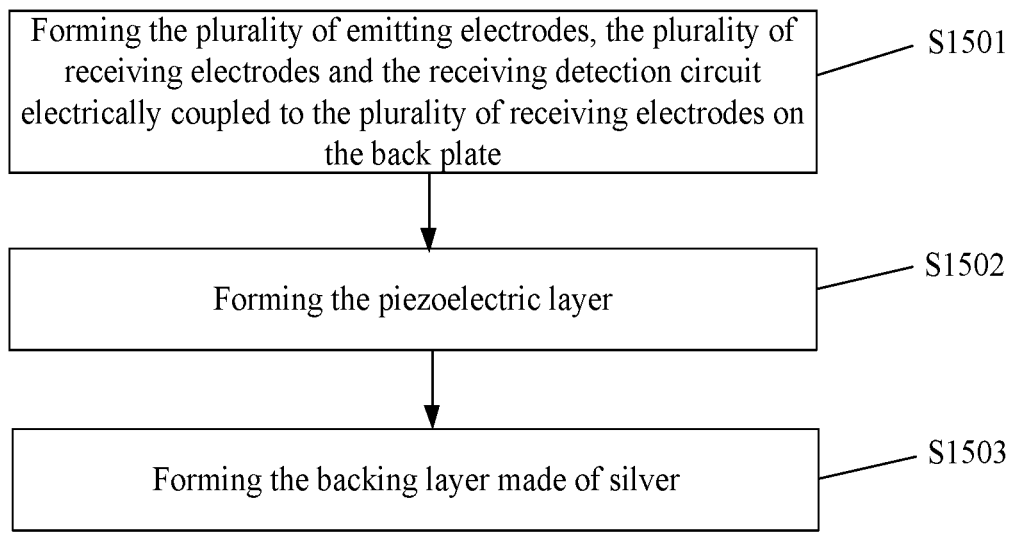
FIG. 15 is a method for manufacturing an ultrasonic sensor according to an embodiment of the present disclosure.

Based on the structure of the ultrasonic sensor described above, this embodiment also provides a method for manufacturing an ultrasonic sensor, which is different from the method for manufacturing the ultrasonic sensor in the embodiment shown in FIG. 4 in that, the forming a sounding structure includes a step of forming a plurality of emitting electrodes, a plurality of receiving electrodes, and a piezoelectric layer on a back plate on which a first insulating layer is formed, as shown in FIG. 15. A pattern of hollow-out regions in the plurality of emitting electrodes is formed while forming the plurality of emitting electrodes. After forming the plurality of emitting electrodes and before forming the plurality of receiving electrodes, the method further includes a step of forming a sixth insulating layer and via holes therein, through which the first electrode of the transistor and the third electrode of the diode are coupled to the receiving electrodes.

Other steps of the method for manufacturing the ultrasonic sensor in this embodiment are the same as those in the embodiment shown in FIG. 4, and are not described herein again.

On the basis of the structure of the ultrasonic sensor in the embodiment shown in FIG. 4, the present embodiment provides an ultrasonic sensor, which is different from the embodiment shown in FIG. 8 in that, as shown in FIG. 10, the plurality of signal leads 24 and the first electrode 421 of the transistor 42 are made of a same material and are disposed in a same layer; the plurality of signal leads 24 are coupled to the plurality of emitting electrodes 21 through via holes in the first insulating layer 5; the sixth insulating layer 10 is disposed between the plurality of emitting electrodes 21 and the plurality of receiving electrodes 22. As shown in FIG. 9, hollowed-out regions 210 are provided in each emitting electrode 21, the hollowed-out regions 210 are filled with a material of the sixth insulating layer 10, and the first electrode 421 of the transistor 42 and the third electrode 412 of the diode 41 are coupled to the receiving electrode 22 through via holes in the material of the sixth insulating layer in the hollowed-out regions 210 and the first insulating layer 5.

Other structures of the ultrasonic sensor in this embodiment are the same as those in the embodiment shown in FIG. 8, and are not described herein again.

The method for driving the ultrasonic sensor in this embodiment is the same as that in the embodiment shown in FIG. 8, and is not described herein again.

Based on the above structure of the ultrasonic sensor, this embodiment further provides a method for manufacturing the ultrasonic sensor, which is different from the method for manufacturing the ultrasonic sensor of the embodiment shown in FIG. 8 in that the plurality of signal leads and the first and second electrodes of the transistor and the third and fourth electrodes of the diode are simultaneously formed by a single patterning process.

Other steps of the method for manufacturing the ultrasonic sensor in this embodiment are the same as those shown in the embodiment shown in FIG. 8, and are not described herein again.

In the present disclosure: in the ultrasonic sensor provided by the present disclosure, the emitting electrodes are provided as the plurality of patterned electrodes which are arranged in an array, each emitting electrode is individually coupled to one signal lead, so that an independent signal control for each patterned electrode may be realized. In the stage of emitting sound source signals, the piezoelectric layer is deformed under the action of the voltage difference between the emitting electrode and the receiving electrodes to emit a sound source signal; the driving signals with different phases are applied to different emitting electrodes, so that phase delay exists among the driving signals on the emitting electrodes, and a phase-controlled focus is generated at a certain selected position based on constructive interference, so that the ultrasonic sensor is realized as a point sound source.

It will be understood that, the above embodiments are merely exemplary embodiments employed to illustrate the principles of the present disclosure, but the present disclosure is not limited thereto. It will be apparent to one of ordinary skill in the art that various changes and modifications may be made therein without departing from the spirit and scope of the present disclosure, and these changes and modifications are to be considered within the scope of the present disclosure.

The invention claimed is:

1. An ultrasonic sensor, comprising a back plate, a sounding structure on the back plate, and a backing layer on a side of the sounding structure distal to the back plate; wherein
the sounding structure comprises a plurality of emitting electrodes, an opposite electrode, a piezoelectric layer and a plurality of signal leads, and the plurality of emitting electrodes and the opposite electrode are respectively on two sides of the piezoelectric layer; and
the plurality of emitting electrodes are in an array, and each emitting electrode of the plurality of emitting electrodes is individually coupled to one signal lead of the plurality of signal leads; and
wherein the opposite electrode comprises a plurality of receiving electrodes in an array and a plurality of receiving detection circuits electrically coupled to the plurality of receiving electrodes, and the plurality of receiving electrodes are on a side of the piezoelectric layer proximal to the back plate, and the receiving detection circuits are on a side of the sounding structure proximal to the back plate.

2. The ultrasonic sensor of claim 1, wherein an orthographic projection of each of the plurality of emitting electrodes on the back plate overlaps with an orthographic projection of n*n receiving electrodes of the plurality of receiving electrodes on the back plate; where n is any one of 1 to 9.

3. The ultrasonic sensor of claim 2, wherein each of the plurality of emitting electrodes is square or circular in shape.

4. The ultrasonic sensor of claim 3, wherein each receiving detection circuit comprises a diode and a transistor for each receiving electrode, the transistor comprises an active layer, a gate, a first electrode and a second electrode, the diode comprises a P-type region and an N-type region, and a third electrode and a fourth electrode electrically coupled to the P-type region and the N-type region, respectively, the first electrode and the second electrode of the transistor and the third electrode and the fourth electrode of the diode are made of a same material and are in a same layer, and a first insulating layer is between the first electrode and the second electrode of the transistor and the third electrode and the fourth electrode of the diode and the sounding structure;
the plurality of emitting electrodes are on a side of the piezoelectric layer distal to the back plate, the plurality of receiving electrodes are on a side of the piezoelectric layer proximal to the back plate, and a second insulating layer is between the plurality of receiving electrodes and the piezoelectric layer; and
the first electrode of the transistor and the third electrode of the diode are coupled to the receiving electrode through a via hole in the first insulating layer.

5. The ultrasonic sensor of claim 3, wherein the plurality of signal leads and the plurality of emitting electrodes are in a same layer; and a third insulating layer is between the plurality of emitting electrodes and the backing layer.

6. The ultrasonic sensor of claim 3, wherein the plurality of signal leads are on a side of the plurality of emitting electrodes distal to the piezoelectric layer, and a fourth insulating layer is between the plurality of emitting electrodes and the plurality of signal leads; the plurality of signal leads are coupled to the plurality of emitting electrodes through a plurality of via holes in the fourth insulating layer, respectively; and a fifth insulating layer is between the plurality of signal leads and the backing layer.

7. The ultrasonic sensor of claim 4, wherein the plurality of signal leads and the first electrode of the transistor are made of a same material and are in a same layer, and the plurality of signal leads are coupled to the plurality of emitting electrodes through a plurality of via holes in the first insulating layer, the second insulating layer, and the piezoelectric layer, respectively; and a third insulating layer is between the plurality of emitting electrodes and the backing layer.

8. The ultrasonic sensor of claim 1, wherein a material of the plurality of emitting electrodes and a material of the plurality of signal leads comprise a metallic conductive material, and a material of the backing layer comprises silver.

9. A method for driving the ultrasonic sensor of claim 1, comprising steps of:
applying a ground voltage signal to the opposite electrode; and
applying a plurality of driving voltage signals to the plurality of emitting electrodes, respectively, such that the plurality of driving voltage signals applied to the plurality of emitting electrodes have different phases.

10. The method of claim 9, wherein the step of applying a plurality of driving voltage signals to the plurality of emitting electrodes respectively comprises simultaneously applying a plurality of driving voltage signals with different phases to the plurality of emitting electrodes.

11. The method of claim 9, wherein the step of applying a plurality of driving voltage signals to the plurality of emitting electrodes respectively comprises applying a same driving voltage signal to the plurality of emitting electrodes at different times.

12. A method for manufacturing the ultrasonic sensor of claim 1, comprising steps of sequentially forming the sounding structure on the back plate and forming the backing layer, wherein the step of forming the sounding structure comprises forming the plurality of emitting electrodes, forming the opposite electrode, forming the piezoelectric layer and forming the plurality of signal leads, and the plurality of emitting electrodes and the opposite electrode are respectively arranged on two sides of the piezoelectric layer; and wherein the steps of forming the plurality of emitting electrodes and forming the plurality of signal leads comprise forming a pattern of the plurality of emitting electrodes arranged in the array and the plurality of signal leads, such that each of the plurality of emitting electrodes is individually coupled to one of the plurality of signal leads.

13. The method for manufacturing an ultrasonic sensor of claim 12, wherein
the steps of forming the plurality of emitting electrodes and forming the plurality of signal leads comprise simultaneously forming the pattern of the plurality of emitting electrodes and the plurality of signal leads on a side of the piezoelectric layer distal to the back plate by a single patterning process.

14. An ultrasonic sensor, comprising a back plate, a sounding structure on the back plate, and a backing layer on a side of the sounding structure distal to the back plate; wherein
the sounding structure comprises a plurality of emitting electrodes, an opposite electrode, a piezoelectric layer and a plurality of signal leads, and the plurality of emitting electrodes and the opposite electrode are respectively on two sides of the piezoelectric layer; and
the plurality of emitting electrodes are in an array, and each emitting electrode of the plurality of emitting electrodes is individually coupled to one signal lead of the plurality of signal leads,
wherein the backing layer and the opposite electrode are a unitary structure; and
the ultrasonic sensor further comprises a plurality of receiving electrodes in an array on a side of the piezoelectric layer proximal to the back plate, and a plurality of receiving detection circuits electrically coupled to the plurality of receiving electrodes, wherein,
each receiving detection circuit comprises a diode and a transistor for each receiving electrode, the transistor comprises an active layer, a first electrode and a second electrode, the diode comprises a third electrode and a fourth electrode, the first electrode and the second electrode of the transistor and the third electrode and the fourth electrode of the diode are made of a same material and are in a same layer, and a first insulating layer is between the first electrode and the second electrode of the transistor and the third electrode and the fourth electrode of the diode and the sounding structure; and
the plurality of emitting electrodes are on a side of the plurality of receiving electrodes proximal to the back plate, a second insulating layer is between the plurality of receiving electrodes and the piezoelectric layer, and a sixth insulating layer is between the plurality of emitting electrodes and the plurality of receiving electrodes.

15. The ultrasonic sensor of claim 14, wherein a material of the backing layer and the opposite electrode comprises silver.

16. The ultrasonic sensor of claim 14, wherein the plurality of signal leads and the plurality of emitting electrodes are in a same layer; and
each emitting electrode of the plurality of emitting electrodes has hollowed-out regions, the hollowed-out regions are filled with a material of the sixth insulating layer, and the first electrode of the transistor and the third electrode of the diode are coupled to the receiving electrode through via holes in the first insulating layer and in the material of the sixth insulating layer in the hollowed-out regions.

17. The ultrasonic sensor of claim 14, wherein the plurality of signal leads and the first electrode of the transistor are made of a same material and are in a same layer; the plurality of signal leads are coupled to the plurality of emitting electrodes through a plurality of via holes in the first insulating layer, respectively;
each emitting electrode of the plurality of emitting electrodes has hollowed-out regions, the hollowed-out regions are filled with a material of the sixth insulating layer, and the first electrode of the transistor and the third electrode of the diode are coupled to the receiving electrode through via holes in the first insulating layer and in the material of the sixth insulating layer in the hollowed-out regions.

18. A method for manufacturing the ultrasonic sensor of claim 14, comprising steps of sequentially forming the sounding structure on the back plate and forming the backing layer, wherein the step of forming the sounding structure comprises forming the plurality of emitting electrodes, forming the opposite electrode, forming the piezoelectric layer and forming the plurality of signal leads, and the plurality of emitting electrodes and the opposite electrode are respectively arranged on two sides of the piezoelectric layer; and wherein

- the steps of forming the plurality of emitting electrodes and forming the plurality of signal leads comprise forming a pattern of the plurality of emitting electrodes arranged in the array and the plurality of signal leads, such that each of the plurality of emitting electrodes is individually coupled to one of the plurality of signal leads,
- wherein the steps of forming the backing layer and forming the opposite electrode comprise forming the backing layer and the opposite electrode as a unitary structure; and
- the method further comprises forming the plurality of receiving electrodes and the plurality of receiving detection circuits electrically coupled to the plurality of receiving electrodes on a side of the piezoelectric layer proximal to the back plate, such that each receiving detection circuit comprises the diode and the transistor for each receiving electrode, and the transistor comprises the active layer, the first electrode and the second electrode; the diode comprises the third electrode and the fourth electrode; the first electrode and the second electrode of the transistor, the third electrode and the fourth electrode of the diode and the plurality of signal leads are formed simultaneously by a single patterning process.

19. A method for driving the ultrasonic sensor of claim 14, comprising steps of:
- applying a ground voltage signal to the opposite electrode; and
- applying a plurality of driving voltage signals to the plurality of emitting electrodes, respectively, such that the plurality of driving voltage signals applied to the plurality of emitting electrodes have different phases.

20. The method of claim 19, wherein the step of applying a plurality of driving voltage signals to the plurality of emitting electrodes respectively comprises simultaneously applying a plurality of driving voltage signals with different phases to the plurality of emitting electrodes.

* * * * *